US011451077B2

(12) United States Patent
Sun et al.

(10) Patent No.: US 11,451,077 B2
(45) Date of Patent: Sep. 20, 2022

(54) ELECTRONIC EQUIPMENT, CHARGER AND CHARGING METHOD

(71) Applicant: Beijing Xiaomi Mobile Software Co., Ltd., Beijing (CN)

(72) Inventors: Wei Sun, Beijing (CN); Zhenfei Lei, Beijing (CN); Xiangdong Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 985 days.

(21) Appl. No.: 15/678,073

(22) Filed: Aug. 15, 2017

(65) Prior Publication Data

US 2018/0048170 A1 Feb. 15, 2018

(51) Int. Cl.
*H02J 7/00* (2006.01)
(52) U.S. Cl.
CPC ............. *H02J 7/0045* (2013.01); *H02J 7/00* (2013.01); *H02J 7/00036* (2020.01); *H02J 7/00034* (2020.01); *H02J 2207/40* (2020.01)
(58) Field of Classification Search
CPC ...... H02J 7/0042; H02J 7/0044; H02J 7/0045; H02J 2207/20; H02J 2207/40; H02J 7/007; H02J 7/0072
USPC ....................................................... 320/107
See application file for complete search history.

(56) References Cited

U.S. PATENT DOCUMENTS 7,880,445 B2 *   2/2011   Hussain ................ H02J 7/0071
                                                    320/164
9,588,560 B2     3/2017   Talmola
9,866,055 B2 *   1/2018   Agarwal ................... H02J 7/00
10,082,853 B2 *   9/2018   Sun .......................... G06F 1/266
2007/0032098 A1 *  2/2007   Bowles ................. H01M 10/46
                                                    439/11
2012/0104994 A1 *  5/2012   Esnard-Domerego .......
                                                    H02J 7/0029
                                                    320/107

(Continued)

FOREIGN PATENT DOCUMENTS

CN       102769156 A      11/2012
CN       104993182 A      10/2015

(Continued)

OTHER PUBLICATIONS

The First Office Action in Chinese Patent Application No. 201680000785.X, dated Aug. 30, 2018.

(Continued)

*Primary Examiner* — Drew A Dunn
*Assistant Examiner* — Tarikh Kanem Rankine
(74) *Attorney, Agent, or Firm* — Jun He Law Offices P.C.; James J. Zhu

(57) ABSTRACT

An electronic equipment, a charger and a charging method are provided. The charging method includes that: a processor determines a type of a charger coupled with a physical charging interface through a communication control chip; when the charger is a preset charger, the processor sets a direct charging control switch into an ON state, and controls the charger to perform charging according to a first charging mode; and when the charger is not the preset charger, the processor sets the direct charging control switch into an OFF state, and performs charging through charging chips according to a second charging mode.

15 Claims, 7 Drawing Sheets

(56) References Cited

U.S. PATENT DOCUMENTS

| | | | | |
|---|---|---|---|---|
| 2012/0217935 | A1* | 8/2012 | Hawawini | H02J 7/04 320/162 |
| 2013/0271065 | A1* | 10/2013 | Chou | G01R 31/36 320/107 |
| 2013/0334883 | A1* | 12/2013 | Kim | G06F 1/263 307/29 |
| 2014/0009120 | A1* | 1/2014 | Kim | H02J 2207/40 320/138 |
| 2014/0122909 | A1* | 5/2014 | Hawawini | H02J 5/00 713/310 |
| 2014/0139176 | A1* | 5/2014 | Ji | H02J 7/007184 320/107 |
| 2014/0191033 | A1* | 7/2014 | Wojcik | G06K 7/10009 235/449 |
| 2015/0073591 | A1* | 3/2015 | Falk | B60L 53/65 700/237 |
| 2015/0236539 | A1* | 8/2015 | Park | G06F 1/263 455/573 |
| 2015/0286605 | A1* | 10/2015 | Waters | G06F 13/4221 710/105 |
| 2015/0346790 | A1 | 12/2015 | Talmola | |
| 2015/0365237 | A1* | 12/2015 | Soffer | G06F 21/85 726/20 |
| 2015/0372519 | A1* | 12/2015 | Abe | H02J 7/02 320/107 |
| 2016/0064959 | A1* | 3/2016 | Jung | H02J 7/007 320/162 |
| 2016/0064962 | A1 | 3/2016 | Huang et al. | |
| 2016/0064977 | A1* | 3/2016 | Chen | H02J 7/00 320/114 |
| 2016/0241016 | A1* | 8/2016 | Rana | H02J 7/0029 |
| 2016/0268833 | A1* | 9/2016 | Lee | H02J 50/80 |
| 2016/0323620 | A1* | 11/2016 | Kim | H04N 19/423 |
| 2016/0336779 | A1* | 11/2016 | Hu | H02J 7/00 |
| 2016/0364360 | A1* | 12/2016 | Lim | H01R 24/60 |
| 2016/0372963 | A1* | 12/2016 | Sankar | H02J 50/05 |
| 2016/0378971 | A1* | 12/2016 | Dunstan | G06F 13/102 726/17 |
| 2017/0031403 | A1* | 2/2017 | Waters | G06F 13/4282 |
| 2017/0038810 | A1* | 2/2017 | Ueki | G06F 1/266 |
| 2017/0040812 | A1 | 2/2017 | Li et al. | |
| 2017/0040813 | A1* | 2/2017 | Hu | H02J 7/02 |
| 2017/0040814 | A1* | 2/2017 | Hu | H02J 7/00714 |
| 2017/0079056 | A1* | 3/2017 | Sakwa | H04L 67/322 |
| 2017/0085098 | A1* | 3/2017 | Sporck | H02J 7/007 |
| 2017/0222453 | A1* | 8/2017 | Wang | H02J 7/0013 |
| 2017/0256968 | A1* | 9/2017 | Yoon | H02J 7/0071 |
| 2017/0269141 | A1* | 9/2017 | Sporck | G01R 31/66 |
| 2017/0271897 | A1* | 9/2017 | Wen | H02J 7/0029 |
| 2017/0286360 | A1* | 10/2017 | Srivastava | G06F 13/4295 |
| 2017/0293335 | A1* | 10/2017 | Dunstan | H02M 1/08 |
| 2017/0294789 | A1* | 10/2017 | Helenius | H02J 7/0027 |
| 2017/0344508 | A1* | 11/2017 | Setiawan | G06F 13/4282 |
| 2018/0026462 | A1* | 1/2018 | Von Novak, III | H04W 4/80 320/107 |
| 2018/0248384 | A1* | 8/2018 | Peng | H02J 7/007182 |

FOREIGN PATENT DOCUMENTS

| | | |
|---|---|---|
| CN | 105098945 A | 11/2015 |
| CN | 105140583 A | 12/2015 |
| CN | 105553001 A | 5/2016 |
| CN | 105656162 A | 6/2016 |
| CN | 105826979 A | 8/2016 |
| WO | 2017180354 A1 | 10/2017 |

OTHER PUBLICATIONS

The English translation of the Written Opinion of the International Search Authority of PCT application No. PCT/CN2016/095374, dated May 22, 2017.

International Search Report in international application No. PCT/CN2016/095374, dated May 22, 2017.

The Written Opinion of the International Search Authority in international application No. PCT/CN2016/095374, dated May 22, 2017.

Supplementary European Search Report in European application No. 17183687.7, dated Jun. 5, 2018.

Andrew Cunningham: "USB-IF battles malware and bad chargers with Type-C Authentication spec", Apr. 12, 2016 (Apr. 12, 2016), XP002780738, Retrieved from the Internet: URL:https://arstechnica.com/gadgets/2016/04/usb-if-battles-malware-and-bad-chargers-with-type-c-authentication-spec/[retrieved on May 3, 2018] the whole document.

Peter Liu: USB 3.1/USB Type-C , Sep. 23, 2015 (Sep. 23, 2015), pp. 1-6, XP002780737, Retrieved from the Internet: URL:https://www.mouser.com/catalog/additional/Comchip_Article%20USB%203.1%20and%20USB%20Type-C%2020150923.pdf [retrieved on May 3, 2018] p. 1-p. 2.

First Office Action of the European application No. 17183687.7, dated Apr. 22, 2021.

* cited by examiner

ELECTRONIC EQUIPMENT, CHARGER AND CHARGING METHOD

CROSS-REFERENCE TO RELATED APPLICATIONS

This application is based upon and claims priority to International Application No. PCT/CN2016/095374, filed on Aug. 15, 2016, the entire contents of which are incorporated herein by reference.

TECHNICAL FIELD

The present disclosure generally relates to electronics, and more particularly, to electronic equipment, a charger and a charging method.

BACKGROUND

Electronic equipment such as a smart mobile phone and a tablet computer is usually charged through a wired charger.

Along with continuous increase of battery capacity of electronic equipment, Quick Charge (QC) methods continuously emerge. In a related technology, there are mainly two QC methods: high-voltage charge and direct charge. At present, electronic equipment may support only one of the two QC methods, and may not achieve compatibility with both of the QC methods at the same time.

SUMMARY

According to a first aspect of the embodiments of the present disclosure, electronic equipment is provided, which includes: a processor, a communication control chip, a direct charging control switch, a charging chip, a physical charging interface and a battery, wherein the processor is electrically coupled with the communication control chip, the direct charging control switch, and the charging chip; the communication control chip, the direct charging control switch and the charging chip are all electrically coupled with the physical charging interface; and the direct charging control switch and the charging chip are all electrically coupled with the battery.

In some embodiments, the processor may be configured to: determine a type of a charger coupled with the physical charging interface through the communication control chip; set the direct charging control switch into an ON state and control the charger to perform charging according to a first charging mode when the charger is a preset charger; and set the direct charging control switch into an OFF state and perform charging through the charging chip according to a second charging mode when the charger is not the preset charger.

In some embodiments, the first charging mode may be a direct charging mode; and the second charging mode may be an ordinary charging mode or a high-voltage charging mode.

In some embodiments, the charging chip may be at least two charging chips coupled in parallel with each other.

In some embodiments, the at least two charging chips may be configured to input a charging current to the battery in the second charging mode.

In some embodiments, the communication control chip may include: a logic control chip and a transmission chip, and the transmission chip may support a preset transmission protocol; the logic control chip may be electrically coupled with the physical charging interface and the transmission chip; and the transmission chip may be electrically coupled with the logic control chip and the processor.

The logic control chip may be configured to establish a communication connection with the charger when the charger is coupled to the physical charging interface, and the transmission chip may be configured to send a charging control instruction generated by the processor to the charger in the first charging mode according to the preset transmission protocol.

In some embodiments, the preset transmission protocol may be a Power Delivery (PD) protocol.

In some embodiments, the physical charging interface may be a Universal Serial Bus TYPE-C (USB TYPE-C) interface; the USB TYPE-C interface may include: a Ground (GND) pin, Voltage Bus (VBUS) pins and a Configuration Channel (CC) pin; the direct charging control switch may be electrically coupled with the VBUS pins in the USB TYPE-C interface; the communication control chip may be electrically coupled with the VBUS pins or the CC pin in the USB TYPE-C interface; and the GND pin in the USB TYPE-C interface may be grounded.

In some embodiments, a number of the VBUS pins may be at least two; and the at least two VBUS pins may be electrically coupled together.

In some embodiments, the at least two VBUS pins may be configured to reduce direct current impedance and increase the charging current.

In some embodiments, the communication control chip may also include an encryption chip; and the encryption chip may be electrically coupled with the transmission chip.

According to a second aspect of the embodiments of the present disclosure, a charger is provided, which includes: a rectification control chip, a communication control chip and a physical charging interface, wherein the communication control chip and the rectification control chip are both electrically coupled with the physical charging interface; and the communication control chip is electrically coupled with the rectification control chip.

In some embodiments, the communication control chip may include: a logic control chip and a transmission chip, and the transmission chip may support a preset transmission protocol; the logic control chip may be electrically coupled with the physical charging interface and the transmission chip; and the transmission chip may be electrically coupled with the logic control chip.

In some embodiments, the preset transmission protocol may be a PD protocol.

In some embodiments, the physical charging interface may be a USB TYPE-C interface; the USB TYPE-C interface may include: a GND pin, VBUS pins and a CC pin; the rectification control chip may be electrically coupled with the VBUS pins in the USB TYPE-C interface; the communication control chip may be electrically coupled with the VBUS pins or the CC pin in the USB TYPE-C interface; and the GND pin in the USB TYPE-C interface may be grounded.

In some embodiments, a number of the VBUS pins may be at least two; and the at least two VBUS pins may be electrically coupled together.

In some embodiments, the communication control chip may also include an encryption chip; and the encryption chip may be electrically coupled with the transmission chip.

According to a third aspect of the embodiments of the present disclosure, a charging system is provided, which includes: electronic equipment and a charger, wherein the electronic equipment includes any electronic equipment in the first aspect; and the charger includes any charger in the second aspect.

According to a fourth aspect of the embodiments of the present disclosure, a charging method is provided, which is applied to any electronic equipment in the first aspect, the method including that: a processor determines a type of a charger coupled with a physical charging interface through a communication control chip; when the charger is a preset charger, the processor sets a direct charging control switch into an ON state, and controls the charger to perform charging according to a first charging mode; and when the charger is not the preset charger, the processor sets the direct charging control switch into an OFF state, and performs charging through a charging chip according to a second charging mode.

In some embodiments, the step that the processor determines the type of the charger coupled with the physical charging interface through the communication control chip may include that: the processor detects whether the charger supports a preset direct charging protocol or not through the communication control chip, and detects whether the charger supports a high voltage-charging protocol or not through the charging chip; and if the charger supports the preset direct charging protocol and the high voltage-charging protocol, the processor determines that the charger is the preset charger.

In some embodiments, the step that the charger is controlled to perform charging according to the first charging mode may include that: the processor detects whether a voltage of a battery reaches an $i^{th}$ threshold value or not in an $i^{th}$ detection through the charging chip, i being a positive integer; when the voltage of the battery reaches the $i^{th}$ threshold value, the processor generates a charging control instruction according to the voltage of the battery; the processor sends the charging control instruction to the charger through the communication control chip, the charging control instruction being configured to control the charger to reduce a charging current; and it is set that i=i+1, and the step that the processor detects whether the voltage of the battery reaches the $i^{th}$ threshold value or not for the $i^{th}$ detection through the charging chips is re-executed, the $i^{th}$ threshold value being smaller than or equal to an $(i+1)^{th}$ threshold value.

In some embodiments, the method may also include that: the processor detects whether the charging current of the charger is lower than a current threshold value or not through the charging chip; and when the charging current is lower than the current threshold value, the processor sets the direct charging control switch into the OFF state, and performs charging through the charging chip according to the second charging mode.

In some embodiments, the step that the processor sends the charging control instruction to the charger through the communication control chip may include that: the processor sends the charging control instruction to the charger through a transmission chip according to a preset transmission protocol.

In some embodiments, the preset transmission protocol may be a PD protocol.

In some embodiments, the step that the processor sends the charging control instruction to the charger through the transmission chip according to the preset transmission protocol may include that: the processor encrypts the charging control instruction through the transmission chip and an encryption chip; and the processor sends the encrypted charging control instruction to the charger through the transmission chip according to the preset transmission protocol.

In some embodiments, the step that the processor determines the type of the charger coupled with the physical charging interface through the communication control chip may include that: the processor detects whether the charger supports the preset direct charging protocol through the communication control chip or not, and detects whether the charger supports the high voltage-charging protocol or not through the charging chips; if the charger does not support the preset direct charging protocol and the charger supports the high voltage-charging protocol, the processor determines that the charger is a high-voltage charger; and if the charger does not support the preset direct charging protocol and the charger does not support the high voltage-charging protocol, the processor determines that the charger is an ordinary charger.

In some embodiments, the charging chip may be at least two charging chips coupled in parallel with each other; and the step that charging is performed through the charging chip according to the second charging mode may include that: the processor inputs the charging current to the battery through the at least two charging chips.

In some embodiments, the method may also include that: when the charger is coupled to the physical charging interface, the processor establishes a communication connection with the charger through the communication control chip.

According to a fifth aspect of the embodiments of the present disclosure, a charging method is provided, which is applied to any charger in the second aspect, the method including that: a charging control instruction sent by electronic equipment is received through a communication control chip, the charging control instruction being sent by the electronic equipment when determining that the charger is a preset charger; and the electronic equipment is charged with a first charging mode according to the charging control instruction.

In some embodiments, the method may also include that: when the electronic equipment is charged according to the first charging mode, a charging control instruction sent by the electronic equipment after an $i^{th}$ detection is received through the communication control chip, the $i^{th}$ detection referring to the $i^{th}$ time of detection about whether a voltage of a battery reaches an $i^{th}$ threshold value or not, the charging control instruction being an instruction generated by the electronic equipment when the voltage of the battery reaches the $i^{th}$ threshold value and i being a positive integer; a charging current of the charger is controlled through a rectification control chip according to the charging control instruction; and it is set that i=i+1, and the step that the charging control instruction sent by the electronic equipment after the $i^{th}$ detection is received through the communication control chip is re-executed.

In some embodiments, the step that the charging control instruction sent by the electronic equipment after the $i^{th}$ detection is received through the communication control chip may include that: an encrypted charging control instruction sent by the electronic equipment after the $i^{th}$ detection is received through a transmission chip.

In some embodiments, the step that the charging current of the charger is controlled through the rectification control chip according to the charging control instruction may include that: the encrypted charging control instruction is decrypted to obtain a decrypted charging control instruction through an encryption chip; and the charging current of the charger is controlled through the rectification control chip according to the decrypted charging control instruction.

In some embodiments, the method may also include that: when a physical charging interface is coupled to the electronic equipment, a communication connection is established with the electronic equipment through the communication control chip.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
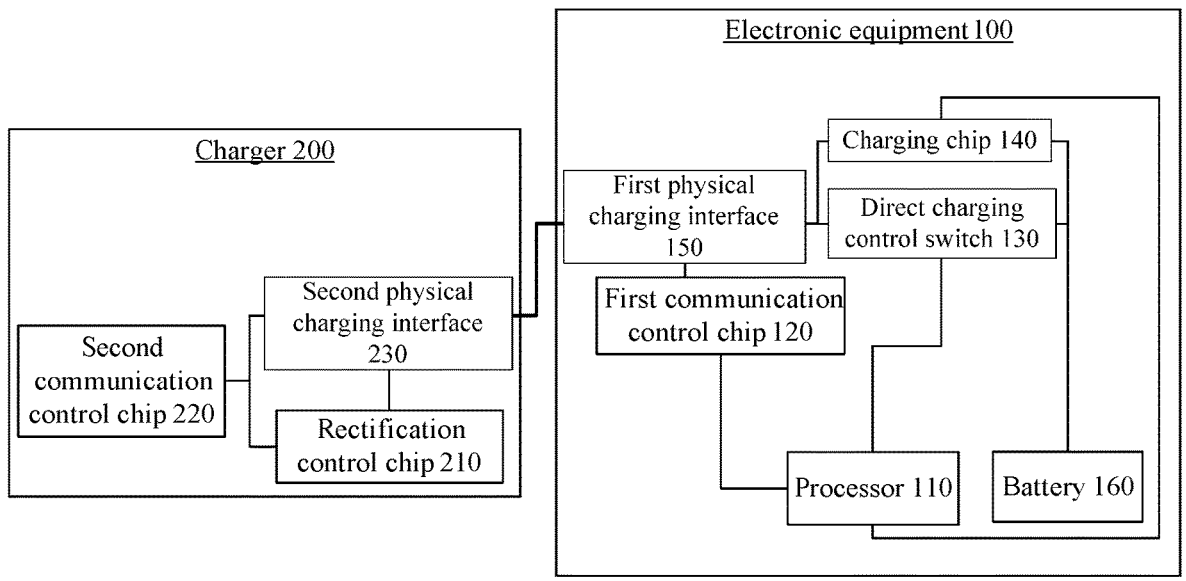
FIG. 1 is a structure diagram of a charging system according to an exemplary embodiment.

FIG. 1 is a structure diagram of a charging system according to an exemplary embodiment. As shown in FIG. 1, the charging system includes: electronic equipment 100 and a charger 200.

The electronic equipment 100 may include: a processor 110, a first communication control chip 120, a direct charging control switch 130, a charging chip 140, a first physical charging interface 150 and a battery 160.

The processor 110 is electrically coupled with the first communication control chip 120, the processor 110 is electrically coupled with the direct charging control switch 130, and the processor 110 is also electrically coupled with the charging chip 140.

The first communication control chip 120, the direct charging control switch 130 and the charging chip 140 are both electrically coupled with the first physical charging interface 150.

The direct charging control switch 130 and the charging chip 140 are all electrically coupled with the battery 160.

The processor 110 is configured to: determining a type of the charger 200 coupled with the first physical charging interface 150 through the first communication control chip 120; when the charger 200 is a preset charger, set the direct charging control switch 130 into an ON state and control the charger 200 to perform charging according to a first charging mode; and when the charger 200 is not the preset charger, set the direct charging control switch 130 into an OFF state and perform charging through the charging chip according to a second charging mode.

In some embodiments, the first charging mode is a direct charging mode, and the second charging mode is an ordinary charging mode or a high-voltage charging mode.

The first charging mode refers to that the charger controls a charging voltage and charging current of the charger according to a charging control instruction sent by the electronic equipment and directly charges the battery of the electronic equipment according to the controlled charging voltage and charging current. The ordinary charging mode refers to that the charger inputs a standard output voltage into the charging chip in the electronic equipment and charges the battery in the electronic equipment through the charging chip. In an embodiment, the standard output voltage is 5V. The high-voltage charging mode refers to that the charger inputs a voltage higher than the standard output voltage into the charging chip in the electronic equipment and the charging chip converts the voltage which is input by the charger and higher than the standard output voltage into a charging voltage to charge the battery.

The charger 200 may include: a rectification control chip 210, a second communication control chip 220 and a second physical charging interface 230.

The second communication control chip 220 and the rectification control chip 210 are both electrically coupled with the second physical charging interface 230.

The second communication control chip 220 is electrically coupled with the rectification control chip 210.

The second communication control chip 220 is configured to receive the charging control instruction sent by the electronic equipment 100, and the charging control instruction is sent by the electronic equipment 100 when determining that the charger 200 is the preset charger. The charger 200 charges the electronic equipment 100 according to the charging control instruction and the first charging mode.

From the above, in the electronic equipment provided by the embodiments of the present disclosure, the processor determines the type of the charger coupled with the physical charging interface through the communication control chip; when the charger is the preset charger, the processor sets the direct charging control switch into the ON state, and controls the charger to perform charging according to the first charging mode; and when the charger is not the preset charger, the processor sets the direct charging control switch into the OFF state and performs charging through the charging chip according to the second charging mode. Thus, the electronic equipment may be compatible with both QC methods. Namely, the electronic equipment is charged with different charging modes according to different types of chargers, and an effect of the electronic equipment being compatible with different charging modes is achieved.

It is supplemented that the electronic equipment 100 in the charging system shown in FIG. 1 may be independently implemented as a structure of electronic equipment and the charger 200 may be independently implemented as a structure of a charger.

In the electronic equipment 100 of the embodiment shown in FIG. 1, descriptions are made as an example with the condition that there is only one charging chip 140. However, there are no specific limits made to the number of charging chips 140 in embodiments of the present disclosure. For example, in a charging system provided by another embodiment shown in FIG. 2, charging chips 140 in electronic equipment 100 are at least two charging chips coupled in parallel with each other.

In some embodiments, the at least two charging chips are configured to input the charging current to the battery in the second charging mode respectively so that a function of shunting the charging current is realized, and heat of the charging chips 140 is reduced.

If currents output by the two charging chips are I1 and I2 respectively, an output voltage of the two charging chips is (I1+I2)*R, wherein R is resistance. If the same output voltage is output by one charging chip, a current output by the charging chip is (I1+I2). Therefore, the charging current may be shunted by the at least two charging chips to reduce heat of each charging chip.

In some embodiments, being different from the electronic equipment 100 in the embodiment shown in FIG. 1, the first communication control chip 120 includes: a first logic control chip 121 and a first transmission chip 122, wherein the first transmission chip 122 supports a preset transmission protocol, the first logic control chip 121 is electrically coupled with the first physical charging interface 150 and the first transmission chip 122, and the first transmission chip 122 is electrically coupled with the first logic control chip 121 and the processor 110.

In some embodiments, the first logic control chip 121 is configured to establish a communication connection with the charger 200 when the charger is coupled to the first physical charging interface 150, and the first transmission chip 122 is configured to send the charging control instruction generated by the processor 110 to the charger 200 according to the preset transmission protocol in the first charging mode.

In some embodiments, the preset transmission protocol is a PD protocol.

In some embodiments, the first physical charging interface 150 is a USB TYPE-C interface; and the first logic control chip 121 is a TYPE-C logic control chip, and the first transmission chip 122 is a chip supporting PD protocol communication.

Figure 2:
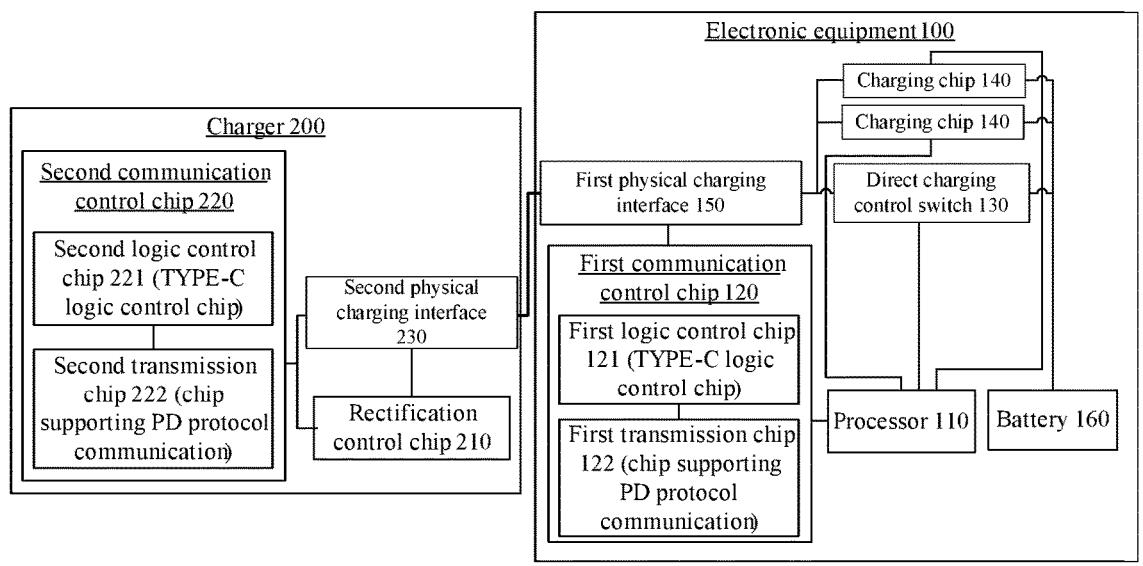
FIG. 2 is a structure diagram of a charging system according to another exemplary embodiment.

Being different from the charger 200 in the embodiment shown in FIG. 1, the second communication control chip 220 in the charger 200 in the embodiment shown in FIG. 2 includes: a second logic control chip 221 and a second transmission chip 222, wherein the second transmission chip 222 supports the preset transmission protocol.

The second logic control chip 221 is electrically coupled with the second physical charging interface 230 and the second transmission chip 222.

The second transmission chip 222 is electrically coupled with the second logic control chip 221.

In some embodiments, the second logic control chip 221 is configured to establish a communication connection with the electronic equipment 100 when the second physical charging interface 230 is coupled to the electronic equipment 100, and the second transmission chip 122 is configured to receive the charging control instruction sent by the electronic equipment 100 according to the preset transmission protocol in the first charging mode.

In some embodiments, the preset transmission protocol is the PD protocol.

In some embodiments, the second physical charging interface 230 is a USB TYPE-C interface; and the second logic control chip 221 is a TYPE-C logic control chip, and the second transmission chip 222 is a chip supporting PD protocol communication.

It is supplemented that the electronic equipment 100 in the charging system shown in FIG. 2 may be independently implemented as a structure of electronic equipment and the charger 200 may be independently implemented as a structure of a charger.

In the charging system in the embodiment shown in FIG. 2, descriptions are made only as an example with the condition that the first communication control chip 120 in the electronic equipment 100 includes the first logic control chip 121 and the first transmission chip 122 and the second communication control chip 220 in the charger 200 includes the second logic control chip 221 and the second transmission chip 222. In another embodiment, the first communication control chip 120 in the electronic equipment 100 also includes a first encryption chip 123, and the second communication control chip 220 in the charger 200 also includes a second encryption chip 223. Specifically, an example of the charging system is provided in FIG. 3 according to an embodiment.

Being different from the electronic equipment 100 in the embodiment shown in FIG. 2, the first communication control chip 120 also includes the first encryption chip 123, wherein the first encryption chip 123 is electrically coupled with the first transmission chip 122.

The first encryption chip 123 is configured to encrypt the charging control instruction generated by the processor in the first charging mode, so that the first transmission chip 122 sends the encrypted charging control instruction to the charger 200 according to the preset transmission protocol.

Being different from the charger 200 in the embodiment shown in FIG. 2, the second communication control chip 220 also includes the second encryption chip 223, wherein the second encryption chip 223 is electrically coupled with the second transmission chip 222.

The second encryption chip 223 is configured to decrypt the encrypted charging control instruction sent by the electronic equipment 100 in the first charging mode, so that the second transmission chip 222 controls the rectification control chip 210 to reduce the charging current of the charger according to the decrypted charging control instruction.

In some embodiments, an encryption protocol adopted in the first encryption chip 123 in the electronic equipment 100 and a decryption protocol adopted in the second encryption chip 223 in the charger 200 form a set of encryption and decryption protocols matched for use.

Figure 3:
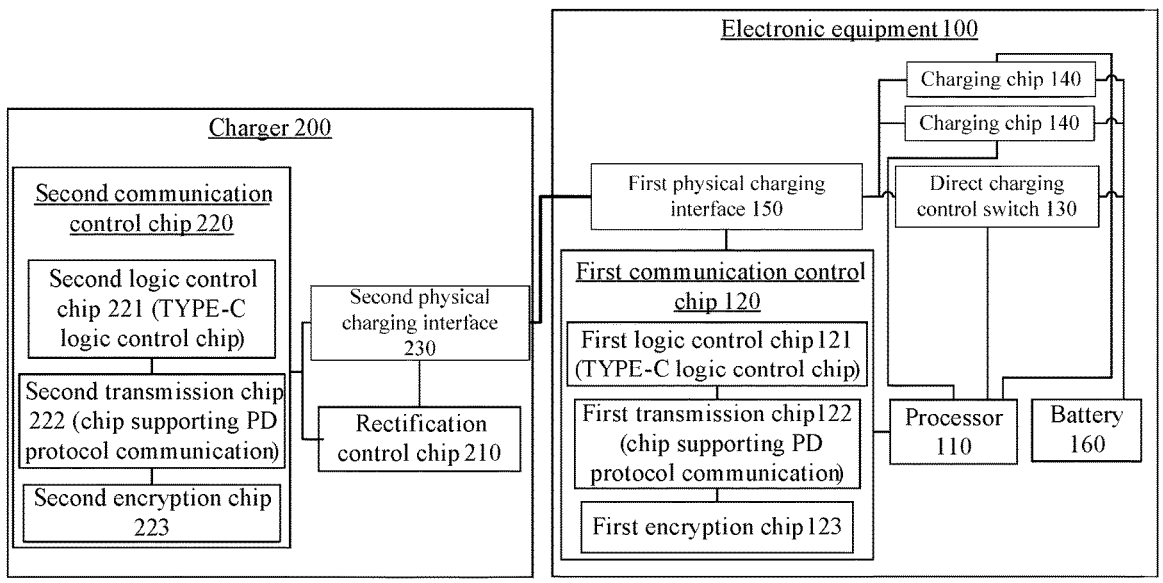
FIG. 3 is a structure diagram of a charging system according to another exemplary embodiment.

It is supplemented that the electronic equipment 100 in the charging system shown in FIG. 3 may be independently implemented as a structure of electronic equipment and the charger 200 may be independently implemented as a structure of a charger.

In the charging system shown in FIG. 2, descriptions are made only as an example with the condition that the first physical charging interface 150 in the electronic equipment 100 is a USB TYPE-C interface and the second physical charging interface 230 in the charger 200 is a USB TYPE-C interface. Specifically, a connection relationship between each pin of the USB TYPE-C interface in the electronic equipment 100 and each pin of the USB TYPE-C interface in the charger 200 is described in an embodiment shown in FIG. 4.

In the electronic equipment 100, the USB TYPE-C interface includes: GND pins, VBUS pins and a CC pin.

The direct charging control switch 130 is electrically coupled with the VBUS pins in the USB TYPE-C interface; the first communication control chip 120 is electrically coupled with the VBUS pins or the CC pin in the USB TYPE-C interface; and the GND pins in the USB TYPE-C interface are grounded.

In some embodiments, a number of the VBUS pins in the USB TYPE-C interface is at least two, and the at least two VBUS pins may be electrically coupled together. For example, the number of the VBUS pins in the USB TYPE-C interface is four, and the four VBUS pins are electrically coupled with the direct charging control switch 130 after being coupled.

In some embodiments, a number of the GND pins in the USB TYPE-C interface is at least two, and the at least two GND pins are electrically coupled together. For example, the number of the GND pins 151 in the USB TYPE-C interface is four, and the four GND pins are grounded after being coupled.

Figure 4:
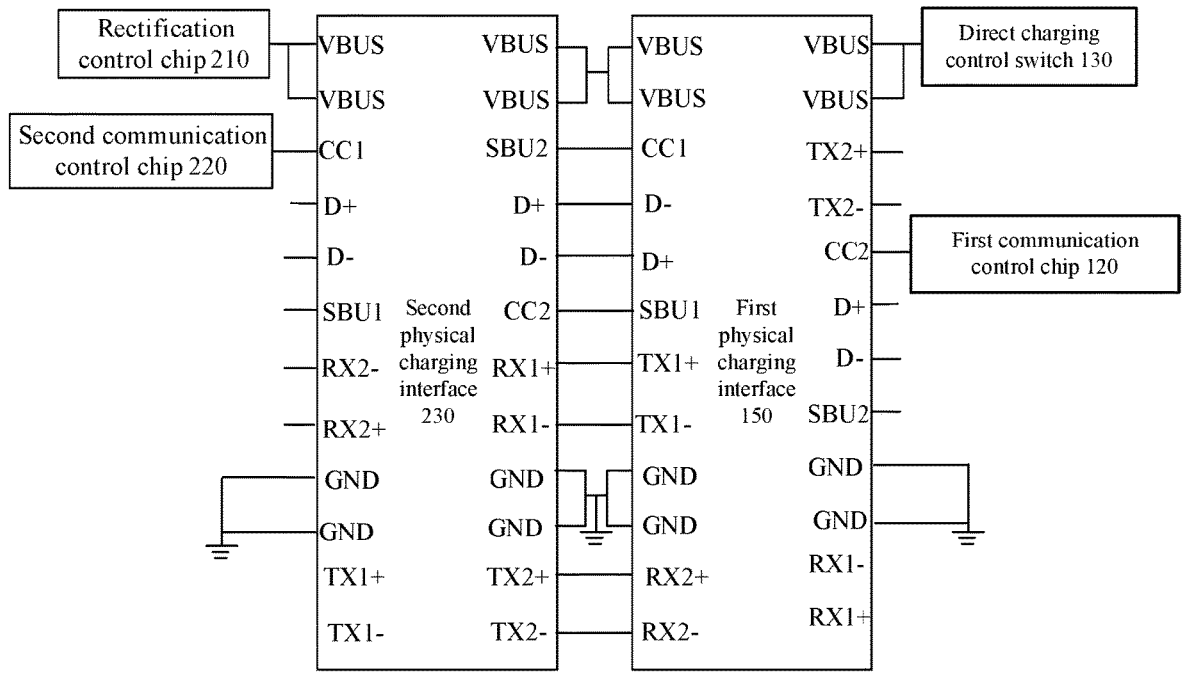
FIG. 4 is a structure diagram of a TYPE-C interface according to another exemplary embodiment.

In some embodiments, as shown in FIG. 4, the USB TYPE-C interface also includes two D+ pins, two D− pins, an SBU1 pin, an SBU2 pin, a TX1+ pin, a TX1− pin, an RX2+ pin, an RX2− pin, a CC1 pin, a CC2 pin, a TX2+ pin, a TX2− pin, an RX1+ pin and an RX1− pin.

In the charger 200, the USB TYPE-C interface includes: GND pins, VBUS pins and a CC pin.

The rectification control chip 210 is electrically coupled with the VBUS pins in the USB TYPE-C interface; the second communication control chip 220 is electrically coupled with the VBUS pins or the CC pin in the USB TYPE-C interface; and the GND pins in the USB TYPE-C interface are grounded.

In some embodiments, a number of the VBUS pins in the USB TYPE-C interface is at least two, and the at least two VBUS pins may be electrically coupled together. For example, the number of the VBUS pins in the USB TYPE-C interface is four, and the four VBUS pins are electrically coupled with the rectification control chip 210 after being coupled.

In some embodiments, a number of the GND pins in the USB TYPE-C interface is at least two, and the at least two GND pins are electrically coupled together. For example, the number of the GND pins in the USB TYPE-C interface is four, and the four GND pins are grounded after being coupled.

In some embodiments, as shown in FIG. 4, the USB TYPE-C interface also includes two D+ pins, two D− pins, an SBU1 pin, an SBU2 pin, a TX1+ pin, a TX1− pin, an RX2+ pin, an RX2− pin, a TX2+ pin, a TX2− pin, a CC1 pin, a CC2 pin, an RX1+ pin and an RX1− pin.

FIG. 4 mainly shows a schematic diagram illustrating connections of the pins of the USB TYPE-C interface in the electronic equipment 100 and the USB TYPE-C interface in the charger 200, and a connection relationship between other chips in the electronic equipment 100 and the charger 200 refers to the embodiments shown in FIG. 1 to FIG. 3.

It is supplemented that the electronic equipment 100 in the charging system shown in FIG. 4 may be independently implemented as a structure of electronic equipment and the charger 200 may be independently implemented as a structure of a charger.

Figure 5:
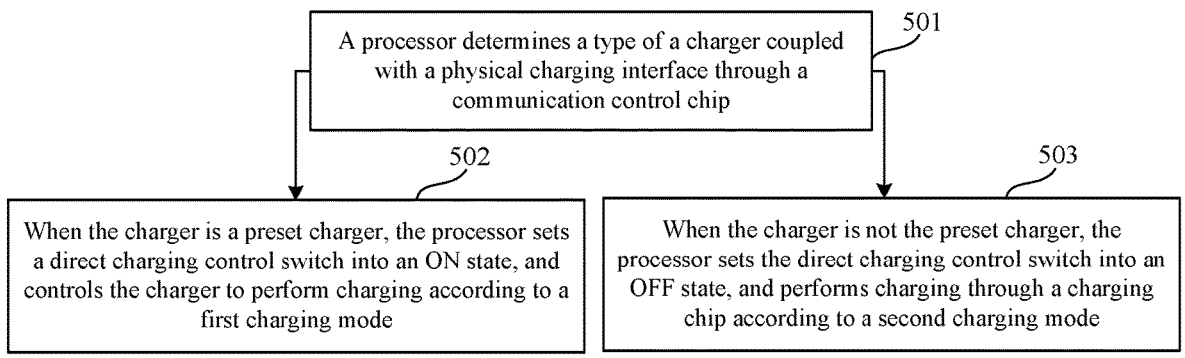
FIG. 5 is a flow chart showing a charging method according to an exemplary embodiment.

FIG. 5 is a flow chart showing a charging method according to an exemplary embodiment. As shown in FIG. 5, the charging method is applied to electronic equipment 100 in the embodiment shown in FIG. 1, and includes the following steps.

In Step 501, a processor determines a type of a charger coupled with a physical charging interface through a communication control chip.

In Step 502, when the charger is a preset charger, the processor sets a direct charging control switch into an ON state, and controls the charger to perform charging according to a first charging mode.

In some embodiments, in the first charging mode, a charging current is input from a second physical charging interface in the charger to a first physical charging interface of the electronic equipment, and then is directly input to a battery to charge the battery through the direct charging control switch.

In Step 503, when the charger is not the preset charger, the processor sets the direct charging control switch into an OFF state, and performs charging through a charging chip according to a second charging mode.

In some embodiments, in the second charging mode, the charging current is input from the second physical charging interface of the charger to the first physical charging interface of the electronic equipment, and then is input to the battery to charge the battery through the charging chip.

From the above, according to the charging method provided by the embodiments of the present disclosure, the processor determines the type of the charger coupled with the physical charging interface through the communication control chip; when the charger is the preset charger, the processor sets the direct charging control switch into the on state, and controls the charger to perform charging according to the first charging mode; and when the charger is not the preset charger, the processor sets the direct charging control switch into the OFF state, and performs charging through the charging chip according to the second charging mode. Thus, the electronic equipment may be compatible with both QC methods. Namely, the electronic equipment is charged with different charging modes according to different types of chargers, and an effect of the electronic equipment be compatible with different charging modes is achieved.

Figure 6:
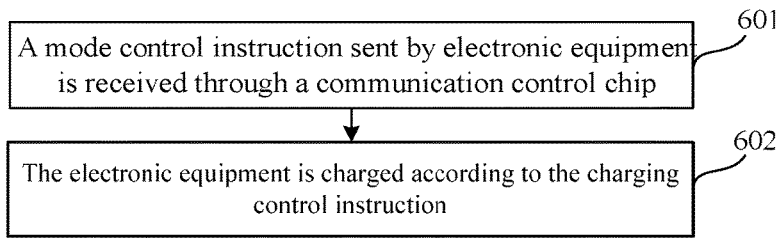
FIG. 6 is a flow chart showing a charging method according to an exemplary embodiment.

FIG. 6 is a flow chart showing a charging method according to an exemplary embodiment. As shown in FIG. 6, the charging method is applied to a charger 200 in the embodiment shown in FIG. 1, and includes the following steps.

In Step 601, a charging control instruction sent by electronic equipment is received through a communication control chip, and the charging control instruction is sent by the electronic equipment when determining that the charger is a preset charger.

In Step 602, the electronic equipment is charged according to the charging control instruction and a first charging mode.

From the above, according to the charging method provided by the embodiment of the present disclosure, the charging control instruction sent by the electronic equipment is received through the communication control chip; and the electronic equipment is charged according to the charging control instruction and the first charging mode. Thus, the charger may charge the electronic equipment not only according to its own charging current. An effect is achieved that the charger controls the charging current of the charger in the first charging mode to make the charging current of the charger be more consistent with a requirement of the electronic equipment according to the received charging control instruction sent by the electronic equipment.

It is supplemented that the charger receives the charging control instruction sent by the electronic equipment through the communication control chip when the electronic equipment is charged according to the first charging mode. The charging control instruction is generated when the processor detects that a voltage of a battery reaches an $i^{th}$ threshold value or not in the $i^{th}$ detection through charging chip. In some embodiments, the $i^{th}$ detection refers to the $i^{th}$ time of detection about whether the voltage of the battery reaches the $i^{th}$ threshold value or not. The charging control instruction is an instruction generated by the electronic equipment when the voltage of the battery reaches the $i^{th}$ threshold value, and i is a positive integer. The charger controls the charging current of the charger through a rectification control chip according to the charging control instruction. In some embodiments, after the electronic equipment is charged according to the first charging mode, it is set that i=i+1, and the step that the charging control instruction sent by the electronic equipment after the $i^{th}$ detection is received through the communication control chip is re-executed. For example, the charger reduces the charging current of the charger and keeps a charging voltage unchanged through the rectification control chip according to the charging control instruction.

Figure 7:
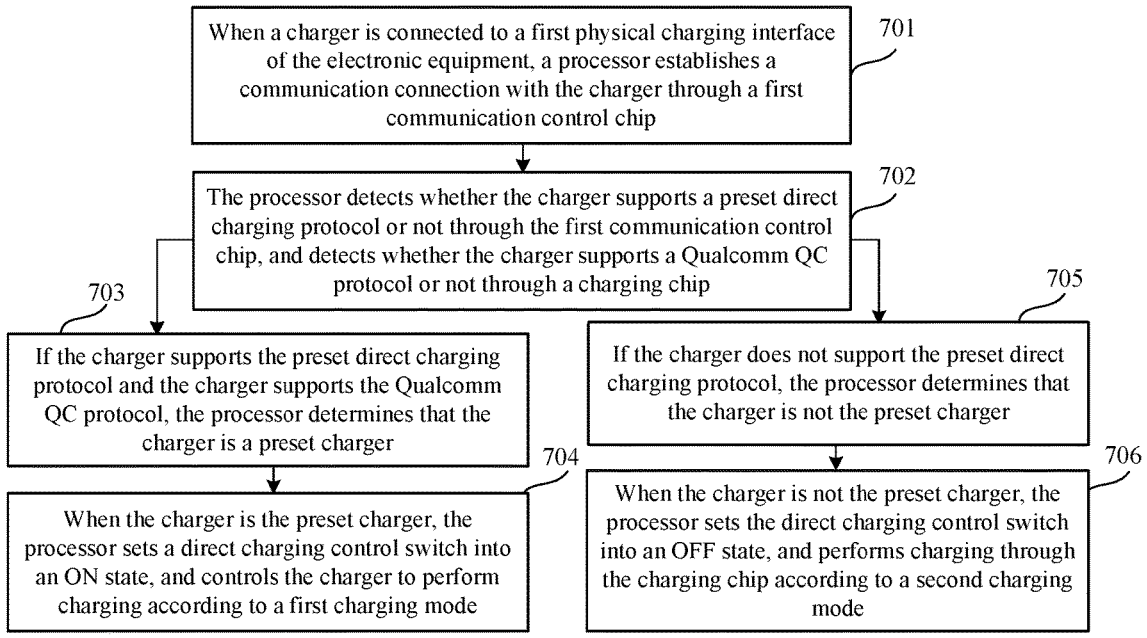
FIG. 7 is a flow chart showing a charging method according to another exemplary embodiment.

FIG. 7 is a flow chart showing a charging method according to another exemplary embodiment. As shown in FIG. 7, the charging method is applied to electronic equipment 100 in the embodiment shown in FIG. 2, and includes the following steps.

In Step 701, when a charger is connected to a first physical charging interface of the electronic equipment, a processor establishes a communication connection with the charger through a first communication control chip.

When the charger is connected to the first physical charging interface of the electronic equipment, the processor in the electronic equipment establishes a connection with the charger through a first logic control chip. The processor determines a master-slave relationship between the electronic equipment and the charger through the first logic control chip. For example, the processor determines that the electronic equipment is slave equipment and the charger is master equipment through the first logic control chip.

Correspondingly, when a second physical charging interface of the charger is connected to the electronic equipment, the charger establishes a communication connection with the electronic equipment through a second communication control chip.

In Step 702, the processor detects whether the charger supports a preset direct charging protocol or not through the first communication control chip, and detects whether the charger supports a high voltage-charging protocol or not through charging chips. In some embodiments, the high voltage-charging may be a Qualcomm QC protocol.

In some embodiments, after the communication connection is established between the first communication control chip of the electronic equipment and the charger, a process that the processor of the electronic equipment detects whether the charger supports the preset direct charging protocol or not through the first communication control chip is as follows: the processor of the electronic equipment sends preset information to the charger through a first transmission chip according to a preset transmission protocol; the charger receives the preset information through a second transmission chip; if the charger sends response information to the electronic equipment according to the received preset information and the preset transmission protocol and the processor of the electronic equipment receives the response information through the first transmission chip, the processor determines that the charger supports the preset direct charging protocol.

In some embodiments, the processor of the electronic equipment simultaneously detects whether the charger supports the high voltage-charging protocol or not through the charging chip when detecting whether the charger supports the preset direct charging protocol or not through the first communication control chip.

By detection of Step 702, charging may be performed by virtue of the following two possible charging modes. A process of performing charging according to a first charging mode includes Step 703 and Step 704; and a process of performing charging according to a second charging mode includes Step 705 and Step 706.

In Step 703, if the charger supports the preset direct charging protocol and the charger supports the high voltage-charging protocol, the processor determines that the charger is a preset charger.

When the processor of the electronic equipment detects that the charger supports the preset direct charging protocol and the charger supports the high voltage-charging protocol, the processor determines that the charger is the preset charger. In an embodiment, the preset charger includes a direct charger.

In Step 704, when the charger is the preset charger, the processor sets a direct charging control switch into an ON state, and controls the charger to perform charging according to a first charging mode.

After the processor of the electronic equipment determines that the charger is the preset charger, the processor sets the direct charging control switch of the electronic equipment into the ON state, and directly controls the charger to charge the electronic equipment through the direct charging control switch according to the first charging mode. In an embodiment, the first charging mode is a direct charging mode.

In Step 705, if the charger does not support the preset direct charging protocol, the processor determines that the charger is not the preset charger.

In some embodiments, if the processor of the electronic equipment detects that the charger does not support the preset direct charging protocol and the charger supports the high voltage-charging protocol, the processor determines that the charger is a high-voltage charger.

In some embodiments, if the processor of the electronic equipment detects that the charger does not support the preset direct charging protocol and the charger does not support the high voltage-charging protocol, the processor determines that the charger is an ordinary charger.

In Step 706, when the charger is not the preset charger, the processor sets the direct charging control switch into an OFF state, and performs charging through the charging chip according to a second charging mode.

In some embodiments, the second charging mode includes a high-voltage charging mode and an ordinary charging mode.

After determining that the charger is the high-voltage charger, the processor sets the direct charging control switch into the OFF state, and performs charging through the charging chip according to the high-voltage charging mode. In some embodiments, when the processor performs charging through the charging chip according to the high-voltage charging mode, a number of the charging chips is at least two, and the at least two charging chips input charging currents into a battery to realize a current shunting function of the charging chips and achieve an effect of reducing heat of the charging chips.

After determining that the charger is the ordinary charger, the processor sets the direct charging control switch into the OFF state, and performs charging through the charging chip according to the ordinary charging mode.

Figure 8:
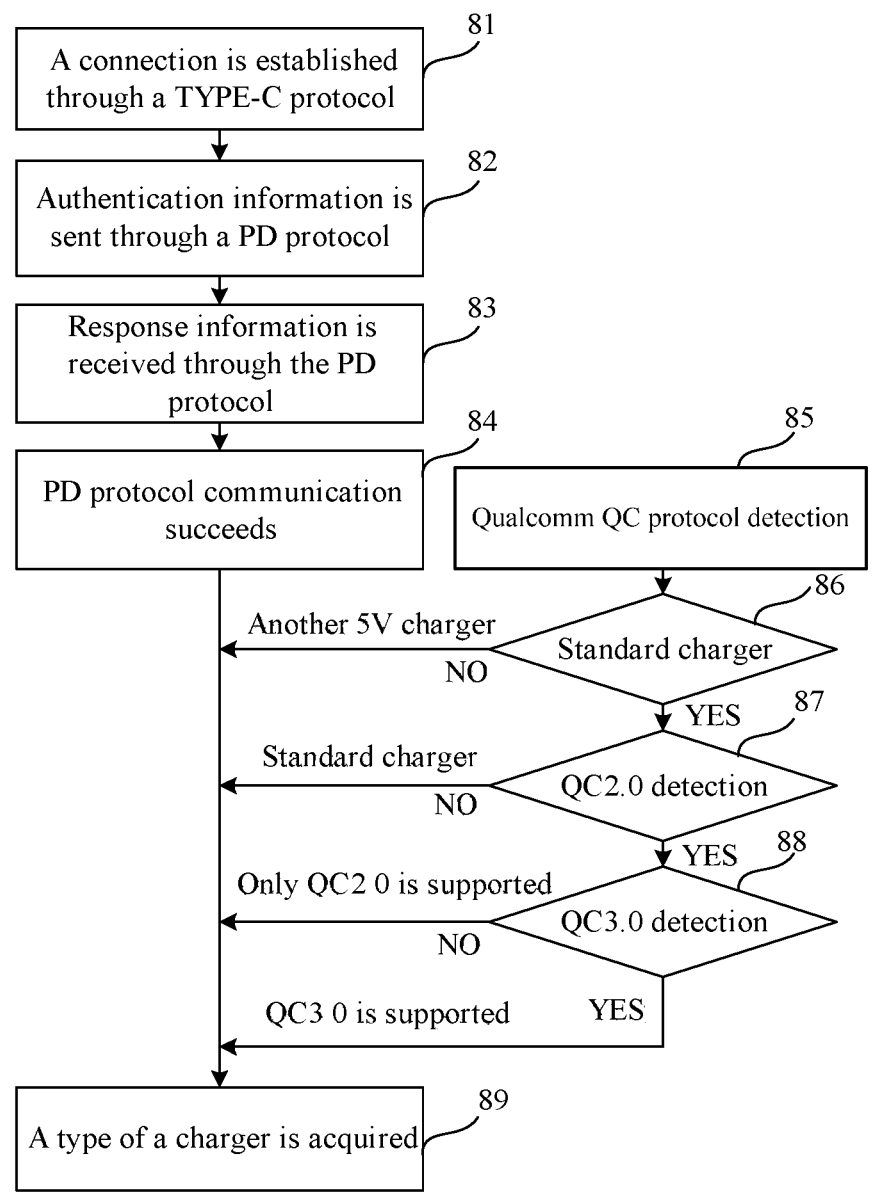
FIG. 8 is a flow chart showing acquisition of a type of a charger according to an exemplary embodiment.

In an exemplary example, FIG. 8 is a simple flow chart showing charger type acquisition of a processor. In Step 81, when the charger is connected to the USB TYPE-C interface of the electronic equipment, the processor establishes the communication connection with the charger through a TYPE-C protocol, and determines that the charger is master equipment and the electronic equipment is slave equipment through a TYPE-C logic control chip. In Step 82, the processor sends authentication information of the preset direct charging protocol to the charger through the transmission chip supporting PD protocol communication according to the PD protocol, and the charger receives the authentication information of the preset direct charging protocol from the electronic equipment through the transmission chip supporting PD protocol communication, and acquires content in the authentication information of the preset direct charging protocol through the PD protocol. In Step 83, the charger sends response information of the preset direct charging protocol to the electronic equipment through the transmission chip supporting PD protocol communication according to the PD protocol. In Step 84, if the electronic equipment receives the response information of the preset direct charging protocol sent by the charger according to the PD protocol, the processor determines that the charger supports the preset direct charging protocol, and the PD protocol communication between the charger successfully performs and the electronic equipment is successful; and if the electronic equipment does not receive the response information of the preset direct charging protocol sent by the charger according to the PD protocol, the processor determines that the charger does not support the preset direct charging protocol. Meanwhile, in Step 85, the processor detects whether the charger supports the high voltage-charging protocol or not through the charging chips, wherein detecting whether the charger supports the high voltage-charging protocol or not may include: in Step 86, it is detected whether the charger is a standard charger or not at first, and if the charger is not the standard charger, the charging chips determine that the charger is other kinds of 5V charger; in Step 87, if the charger is the standard charger, it is detected whether the charger supports QC2.0 or not through the charging chips, and if QC2.0 is not supported, the charging chips determine that the charger is the standard charger; and in Step 88, if QC2.0 is supported, the charging chips detect whether the charger supports QC3.0 or not, the charging chips determine that the charger is a charger only supporting QC2.0 if QC3.0 is not supported, and if QC3.0 is supported, the charging chips determine that the charger is a charger supporting QC3.0. In Step 89, if the charger supports the preset direct charging protocol and the high voltage-charging protocol, the processor determines that the charger is the preset charger; if the charger does not support the preset direct charging protocol but supports the high voltage-charging protocol, the processor determines that the charger is a high-voltage charger; and if the charger does not support the preset direct charging protocol and does not support the high voltage-charging protocol, the processor determines that the charger is an ordinary charger.

From the above, according to the charging method provided by the embodiments of the present disclosure, when the electronic equipment is charged through the communication control chip according to the first charging mode, the charging control instruction sent by the electronic equipment is received; and a rectification control chip is controlled to reduce the charging current of the charger according to the charging control instruction. Thus, the charger may charge the electronic equipment not only according to its own charging current. An effect is achieved that the charger controls the charging current of the charger in the first charging mode to make the charging current of the charger be more consistent with a requirement of the electronic equipment according to the received charging control instruction sent by the electronic equipment.

Figure 9:
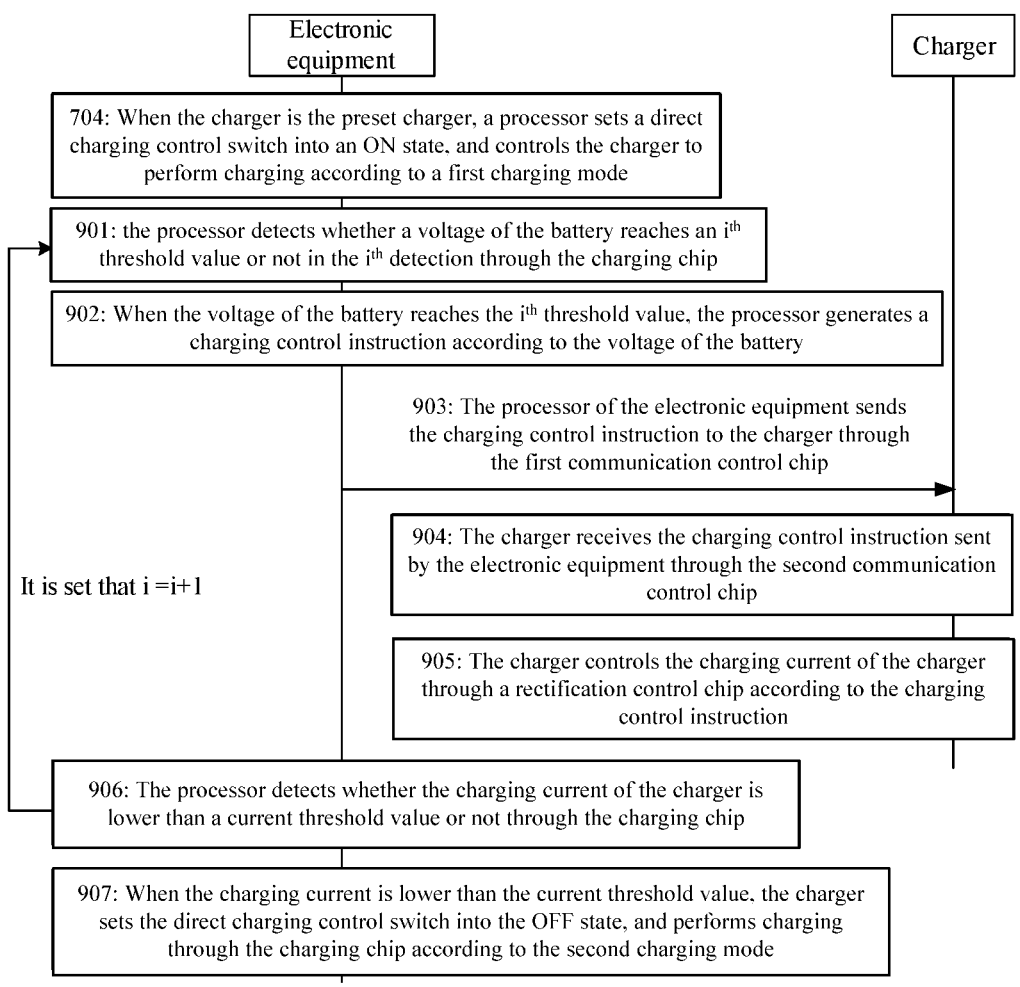
FIG. 9 is a flow chart showing a charging method according to another exemplary embodiment.

On the basis of the embodiment shown in FIG. 7, when the processor sets the direct charging control switch into the ON state and controls the charger to perform charging according to the first charging mode, the charging method may also include the following steps, as shown in FIG. 9.

In Step 901, the processor detects whether a voltage of the battery reaches an $i^{th}$ threshold value or not in the $i^{th}$ detection through the charging chip.

When the processor controls the charger to charge the electronic equipment according to the first charging mode, the processor detects whether the voltage of the battery reaches the $i^{th}$ threshold value or not in the $i^{th}$ detection at a preset time interval through the charging chip, and i is a positive integer.

In an exemplary example, when the processor controls the charger to charge the electronic equipment according to the first charging mode, the processor detects whether the voltage of the battery of the electronic equipment reaches 4.2 volts (V) or not through the charging chip at first.

In Step 902, when the voltage of the battery reaches the $i^{th}$ threshold value, the processor generates a charging control instruction according to the voltage of the battery.

If the processor detects that the voltage of the battery reaches the $i^{th}$ threshold value through the charging chip, the processor generates the charging control instruction according to the detected voltage of the battery, and the charging control instruction is configured to control the charger to control the charging current.

In Step 903, the processor of the electronic equipment sends the charging control instruction to the charger through the first communication control chip.

In some embodiments, the processor sends the generated charging control instruction to the charger through the first transmission chip according to the preset transmission protocol.

In Step 904, the charger receives the charging control instruction sent by the electronic equipment through the second communication control chip.

In some embodiments, the charger receives the charging control instruction sent by the first transmission chip of the electronic equipment according to the preset transmission protocol through the second transmission chip.

In Step 905, the charger controls the charging current of the charger through a rectification control chip according to the charging control instruction.

In some embodiments, after the processor of the electronic equipment sends the charging control instruction, it is set that i=i+1, and the step that the processor detects whether the voltage of the battery reaches the ith threshold value or not in the $i^{th}$ detection through the charging chip is re-executed, wherein the $i^{th}$ threshold value is smaller than or equal to an $(i+1)^{th}$ threshold value.

In Step 906, the processor detects whether the charging current of the charger is lower than a current threshold value or not through the charging chip.

In some embodiments, the processor detects whether the charging current of the charger is lower than the current threshold value or not through the charging chip, after sending the charging control instruction to the charger for the $i^{th}$ time through the first transmission chip.

For example, the charger detects whether the charging current of the charger is lower than 1 ampere (A) or not through the charging chip.

In Step 907, when the charging current is lower than the current threshold value, the charger sets the direct charging control switch into the OFF state, and performs charging through the charging chip according to the second charging mode.

When the processor detects that the charging current of the charger is lower than the current threshold value, the processor sets the direct charging control switch into the OFF state, and performs charging through the charging chip according to the second charging mode. That is, when the processor detects that the charging current of the charger is lower than the current threshold value, the processor switches the charger from the first charging mode to the second charging mode for charging.

Figure 10:
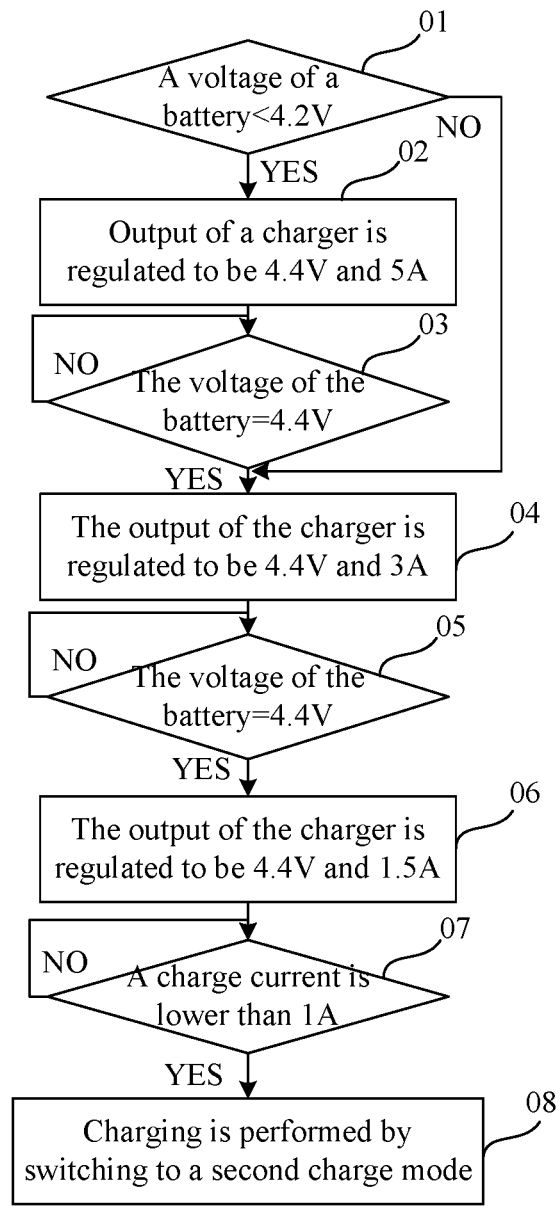
FIG. 10 is a flow chart showing control over a charging current of a charger according to an exemplary embodiment.

In an exemplary example, FIG. 10 is a simple flow chart showing a processor controlling a charging current of a charger through a second transmission chip. In Step 01, the processor detects whether the voltage of the battery is lower than 4.2V or not through the charging chip. In Step 02, if the voltage of the battery is higher than 4.2V, the processor generates a charging control instruction according to the voltage of the battery, and sends it to the charger through the first transmission chip; and the charger controls the rectification control chip to reduce the charging current according to the charging control instruction, regulates a charging voltage of the charger to be 4.4V and regulates the charging current to be 5 A. In Step 03, after a first preset time, the processor detects whether the voltage of the battery reaches 4.4V or not through the charging chip. In step 04, if the voltage of the battery reaches 4.4V, the processor generates a charging control instruction according to the voltage of the battery, and sends it to the charger through the first transmission chip; and the charger controls the rectification control chip to reduce the charging current according to the charging control instruction, regulates the charging voltage of the charger to be 4.4V and regulates the charging current to be 3 A. In Step 05, after a second preset time, the processor detects whether the voltage of the battery reaches 4.4V or not through the charging chip. In Step 06, if the voltage of the battery reaches 4.4V, the processor generates a charging control instruction according to the voltage of the battery, and sends it to the charger through the first transmission chip; and the charger controls the rectification control chip to reduce the charging current according to the charging control instruction, regulates the charging voltage of the charger to be 4.4V and regulates the charging current to be 1.5 A. In Step 07, along with gradual increase of the voltage of the battery, the charging current may be gradually decreased; and after a third preset time, the processor detects whether the charging current of the charger is lower than 1 A or not through the charging chip. In Step 08, if the charging current is lower than 1 A, the processor controls the direct charging control switch to be in the OFF state, and performs charging through the charging chip according to the second charging mode. Herein, when the voltage of the battery is equal to the charging voltage of the charger, the charging voltage may not charge the battery, and the voltage of the battery, detected by the charging chip, is falsely high due to existence of impedance on the battery and a circuit board, so that the voltage of the battery is reduced in a manner of reducing the charging current to achieve an effect of charging the battery more quickly.

From the above, according to the charging method provided by the embodiments of the present disclosure, the processor determines the type of the charger connected with the physical charging interface through the communication control chip; and when the charger is the preset charger, the processor sets the direct charging control switch into the ON state, and controls the charger to perform charging according to the first charging mode. Thus, the electronic equipment may be compatible with both QC methods. Namely, the electronic equipment is charged with different charging modes according to different types of chargers, and an effect of the electronic equipment being compatible with different charging modes is achieved.

In addition, the processor sends the charging control instruction to the charger through the first transmission chip according to the preset transmission protocol, so that stability of the charging control instruction during data transmission is favorably ensured, and security in a charging process is improved.

Figure 11:
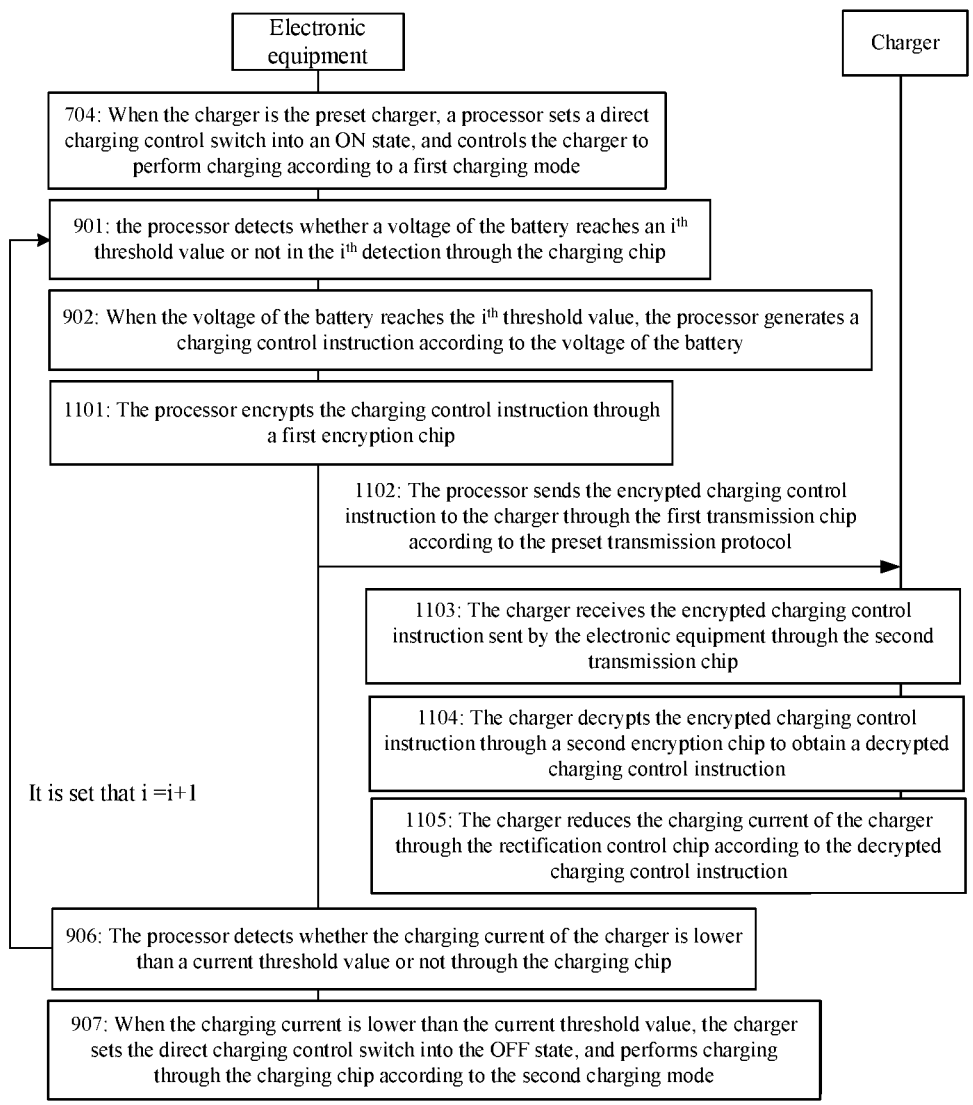
FIG. 11 is a flow chart showing a charging method according to another exemplary embodiment.

On the basis of the embodiment shown in FIG. 9, when the electronic equipment is the electronic equipment 100 shown in FIG. 4, Step 903 to Step 904 may be replaced with the following Step 1101 to Step 1103, as shown in FIG. 11.

In Step 1101, the processor encrypts the charging control instruction through a first encryption chip.

After generating the charging control instruction, the processor encrypts the generated charging control instruction through the first encryption chip.

In Step 1102, the processor sends the encrypted charging control instruction to the charger through the first transmission chip according to the preset transmission protocol.

In Step 1103, the charger receives the encrypted charging control instruction sent by the electronic equipment through the second transmission chip.

The charger receives the encrypted charging control instruction sent by the first transmission chip of the electronic equipment through the second transmission chip according to the preset transmission protocol.

In Step 1104, the charger decrypts the encrypted charging control instruction through a second encryption chip to obtain a decrypted charging control instruction.

The charger decrypts the encrypted charging control instruction through a second encryption chip to obtain the decrypted charging control instruction after receiving the encrypted charging control instruction.

In Step 1105, the charger reduces the charging current of the charger through the rectification control chip according to the decrypted charging control instruction.

From the above, according to the charging method provided by the embodiment of the present disclosure, the processor encrypts the charging control instruction through the first encryption chip and sends the encrypted charging control instruction to the charger, so that effects of stability and security of the charging control instruction in a data transmission process are ensured.

It is supplemented that the processor may perform identity authentication with a Microcontroller Unit (MCU) in the charger in advance before sending the charging control instruction to the charger through the first transmission chip according to the preset transmission protocol. In case of successful identity authentication, the charging control instruction is sent to the charger through the first transmission chip according to the preset transmission protocol. A process of identity authentication performed in advance between the processor and the charger may include that: the processor sends identity authentication information to the charger in a preset form; the charger receives the identity authentication information sent by the processor through the MCU, analyzes content contained in the identity authentication information according to the preset form, and verifies an identity of the electronic equipment; the charger sends an identity authentication response to the charger through the MCU according to the preset form when successfully verifying the identity of the electronic equipment; and the processor performs identity authentication on the charger according to the preset form, and in case of successful identity authentication, sends the charging control instruction to the charger through the first transmission chip according to the preset transmission protocol.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An electronic equipment, comprising: a processor, a communication control chip, a direct charging control switch, one or more charging chips, a physical charging interface and a battery, wherein
   the processor is electrically coupled with the communication control chip, the direct charging control switch, and the one or more charging chips;
   the communication control chip, the direct charging control switch and the one or more charging chips are all electrically coupled with the physical charging interface;
   the direct charging control switch and the one or more charging chips are all electrically coupled with the battery; and
   the processor is configured to determine a type of a charger coupled with the physical charging interface through the communication control chip and the one or more charging chips, and set the direct charging control switch into an ON state or an OFF state based on the type of the charger,
   wherein the processor determines the type of the charger by:
      detecting whether the charger supports a preset direct charging protocol through the communication control chip by:
         sending authentication information of the preset direct charging protocol to the charger according to a Power Delivery (PD) protocol, and receiving response information of the preset direct charging protocol sent by the charger according to the PD protocol;
      detecting whether the charger supports a Qualcomm QC protocol through the one or more charging chips;
      determining that the charger is a preset charger if the charger supports the preset direct charging protocol and the Qualcomm QC protocol;
      determining that the charger is a high-voltage charger if the charger does not support the preset direct charging protocol but supports the Qualcomm QC protocol; and
      determining that the charger is an ordinary charger if the charger does not support the preset direct charging protocol and the Qualcomm QC protocol.

2. The electronic equipment according to claim 1, wherein the one or more charging chips comprises at least two charging chips coupled in parallel with each other.

3. The electronic equipment according to claim 1, wherein the communication control chip comprises: a logic control chip and a transmission chip, and the transmission chip supports the PD protocol;
   the logic control chip is electrically coupled with the physical charging interface and the transmission chip; and
   the transmission chip is electrically coupled with the logic control chip and the processor.

4. The electronic equipment according to claim 3, wherein the communication control chip also comprises an encryption chip; and the encryption chip is electrically coupled with the transmission chip.

5. The electronic equipment according to claim 1, wherein the physical charging interface is a Universal Serial Bus TYPE-C (USB TYPE-C) interface; the USB TYPE-C interface comprises: a Ground (GND) pin, Voltage Bus (VBUS) pins and a Configuration Channel (CC) pin;
   the direct charging control switch is electrically coupled with the VBUS pins in the USB TYPE-C interface;
   the communication control chip is electrically coupled with the VBUS pins or the CC pin in the USB TYPE-C interface; and
   the GND pin in the USB TYPE-C interface is grounded.

6. The electronic equipment according to claim 5, wherein a number of the VBUS pins is at least two; and the at least two VBUS pins are electrically coupled together.

7. A charger, comprising: a rectification control chip, a communication control chip and a physical charging interface, wherein
   the communication control chip and the rectification control chip are both electrically coupled with the physical charging interface;
   the communication control chip is electrically coupled with the rectification control chip;
   the communication control chip is configured to receive an encrypted charging control instruction sent by an electronic equipment coupled with the physical charging interface when it is determined that the charger is a preset charger, and decrypt the encrypted charging control instruction; and
   the rectification control chip is configured to control a charging current of the charger according to the decrypted charging control instruction,
   wherein the preset charger is a charger that supports a preset direct charging protocol and a Qualcomm QC protocol; and
   wherein the communication control chip is further configured to:

receive authentication information of the preset direct charging protocol sent by the electronic equipment according to a Power Delivery (PD) protocol;

acquire content in the authentication information of the preset direct charging protocol through the PD protocol; and send response information of the preset direct charging protocol to the electronic equipment based on the content according to the PD protocol.

8. The charger according to claim 7, wherein the communication control chip comprises a logic control chip and a transmission chip, and the transmission chip supports the PD protocol;

the logic control chip is electrically coupled with the physical charging interface and the transmission chip; and the transmission chip is electrically coupled with the logic control chip.

9. The charger according to claim 8, wherein the communication control chip also comprises an encryption chip; and the encryption chip is electrically coupled with the transmission chip.

10. The charger according to claim 7, wherein the physical charging interface is a Universal Serial Bus TYPE-C (USB TYPE-C) interface; the USB TYPE-C interface comprises: a Ground (GND) pin, Voltage Bus (VBUS) pins and a Configuration Channel (CC) pin;

the rectification control chip is electrically coupled with the VBUS pins in the USB TYPE-C interface;

the communication control chip is electrically coupled with the VBUS pins or the CC pin in the USB TYPE-C interface; and the GND pin in the USB TYPE-C interface is grounded.

11. The charger according to claim 10, wherein a number of the VBUS pins is at least two; and the at least two VBUS pins are electrically coupled together.

12. A charging method for use with an electronic equipment, the method comprising:

determining, by a processor, a type of a charger coupled with a physical charging interface through a communication control chip and one or more charging chips; and setting, by the processor, a direct charging control switch to an ON state when the charger is a preset charger, and controlling the charger to perform charging according to a first charging mode; or setting, by the processor, the direct charging control switch into an OFF state when the charger is not the preset charger, and performing charging through the one or more charging chips according to a second charging mode, wherein the processor determines the type of the charger by:

detecting whether the charger supports a preset direct charging protocol through the communication control chip by:

sending authentication information of the preset direct charging protocol to the charger according to a Power Delivery (PD) protocol, and receiving response information of the preset direct charging protocol sent by the charger according to the PD protocol;

detecting whether the charger supports a Qualcomm QC protocol through the one or more charging chips;

determining that the charger is a preset charger if the charger supports the preset direct charging protocol and the Qualcomm QC protocol;

determining that the charger is a high-voltage charger if the charger does not support the preset direct charging protocol but supports the Qualcomm QC protocol; and determining that the charger is an ordinary charger if the charger does not support the preset direct charging protocol and the Qualcomm QC protocol.

13. The method according to claim 12, wherein controlling the charger to perform charging according to the first charging mode comprises:

detecting, by the processor, whether a voltage of a battery reaches an $i^{th}$ threshold value or not in an $i^{th}$ detection through the one or more charging chips, i being a positive integer;

generating, by the processor, a charging control instruction according to the voltage of the battery when the voltage of the battery reaches the $i^{th}$ threshold value;

sending, by the processor, the charging control instruction to the charger through the communication coltrol chip, the charging control instruction being configured to control the charger to reduce a charging current; and executing the step of detecting, by the processor, whether the voltage of the battery reaches an $(i+1)^{th}$ threshold value or not in an $(i+1)^{th}$ detection through the one or more charging chips, the $i^{th}$ threshold value being smaller than or equal to the $(i+1)^{th}$ threshold value.

14. The method according to claim 13, further comprising:

detecting, by the processor, whether the charging current of the charger is lower than a current threshold value or not through the one or more charging chips; and when the charging current is lower than the current threshold value, setting, by the processor, the direct charging control switch to the OFF state, and performing charging through the one or more charging chips according to the second charging mode.

15. The method according to claim 12, further comprising:

establishing, by the processor, a communication connection with the charger through the communication control chip when the charger is coupled to the physical charging interface.

* * * * *